US008094356B2

(12) United States Patent
Mizoguchi et al.

(10) Patent No.: US 8,094,356 B2
(45) Date of Patent: Jan. 10, 2012

(54) LIGHT SCANNING DEVICE AND IMAGE FORMING DEVICE

(75) Inventors: Yasushi Mizoguchi, Chino (JP); Norio Nakamura, Matsumoto (JP); Hirokazu Yamaga, Chino (JP)

(73) Assignee: Sieko Epson Corporation (JP)

( * ) Notice: Subject to any disclaimer, the term of this patent is extended or adjusted under 35 U.S.C. 154(b) by 0 days.

(21) Appl. No.: 13/100,436

(22) Filed: May 4, 2011

(65) Prior Publication Data

US 2011/0205611 A1 Aug. 25, 2011

Related U.S. Application Data

(63) Continuation of application No. 12/612,859, filed on Nov. 5, 2009, now Pat. No. 7,961,368.

(30) Foreign Application Priority Data

Nov. 7, 2008 (JP) ................................. 2008-286673
Aug. 21, 2009 (JP) ................................. 2009-191779
Nov. 4, 2009 (JP) ................................. 2009-252713

(51) Int. Cl.
G02B 26/08 (2006.01)
(52) U.S. Cl. .................. 359/212.1; 359/224.1
(58) Field of Classification Search .... 359/212.1–214.1, 359/223.1–226.1, 871, 872
See application file for complete search history.

(56) References Cited

U.S. PATENT DOCUMENTS

| 6,605,796 | B2 | 8/2003 | Brandinger et al. |
| 6,937,372 | B2 | 8/2005 | Kandori et al. |
| 7,046,415 | B2 * | 5/2006 | Jilani et al. ................. 359/224.1 |
| 7,149,017 | B2 | 12/2006 | Kandori et al. |
| 7,242,506 | B2 | 7/2007 | Kandori et al. |
| 7,492,495 | B2 | 2/2009 | Ishihara et al. |
| 2008/0239252 | A1 | 10/2008 | Konno et al. |

FOREIGN PATENT DOCUMENTS

| EP | 1275998 | 1/2003 |
| JP | 2003-131151 | 5/2003 |
| JP | 2003-280091 | 10/2003 |
| JP | 2005-173438 | 6/2005 |
| JP | 2007-199251 | 8/2007 |
| JP | 2008-249797 | 10/2008 |

* cited by examiner

Primary Examiner — Euncha Cherry
(74) Attorney, Agent, or Firm — Harness, Dickey & Pierce, P.L.C.

(57) ABSTRACT

A light scanning device includes a light source outputting a laser beam, a light deflecting unit having a light reflecting unit, the light deflecting unit being adapted to be rotatable about a predetermined axis and scanning an object with the laser beam reflected by the light reflecting unit, a drive controlling unit controlling a deflection angle variation in a vertical direction of the light deflecting unit per unit time so that an interval between scanning lines in the vertical direction by the light deflecting unit is constant, and a driving unit rotationally driving the light deflecting unit in accordance with an rotational angle determined by the driving controlling unit.

2 Claims, 6 Drawing Sheets

LIGHT SCANNING DEVICE AND IMAGE FORMING DEVICE

CROSS REFERENCE TO RELATED APPLICATIONS

This application is a continuation patent application of U.S. Ser. No. 12/612,859 filed Nov. 5, 2009, claiming priority to Japanese Patent Application Nos. 2008-286673 filed Nov. 7, 2008, 2009-191779 filed Aug. 21, 2009 and 2009-252713 filed Nov. 4, 2009, all of which are hereby expressly incorporated by reference herein in their entirety.

BACKGROUND

1. Technical Field

The present invention relates to a light scanning device and an image forming device.

2. Related Art

In light deflectors applied to displays, printers, and the like that use laser beams, higher scanning speed has been demanded. However, improvement in performance of polygon mirrors and galvano mirrors that are currently used in the light deflectors is limited. As an alternative to such light deflectors, a mirror device manufactured by processing a silicon substrate with a micro electro mechanical system (MEMS) has been expected. A MEMS mirror can be driven at a higher resonant frequency, thus enables an image having higher resolution to be formed. A projector employing the MEMS mirror is conveniently used in a small-group meeting and the like for performing close projection.

JP-A-2003-131151 is a first example of related art. The first example discloses a light deflecting device for preventing fluctuation of an image as follows: measuring time at which a light beam passes a specified position on a scanning line in a reciprocating scanning; calculating delay time data corresponding to a time lag in the reciprocating scanning of a deflector with respect to a driving signal of the deflector from values of two pieces of the measured time in moving forth and moving back in the scanning; and calculating timing data corresponding to a modulation start time or a modulation end time of the light beam in a single scanning cycle. JP-A-2003-280091 is a second example of related art. The second example discloses a projection display device that is conveniently used in a small-group meeting in a small place.

In a case of close projection, intervals between scanning lines in a vertical direction become wider as the distance from the mirror increases. Thus, resolution of an image is not uniform in a whole screen. With the related art devices disclosed in the first and second examples, this problem cannot be solved.

SUMMARY

An advantage of the invention is to provide a light scanning device and an image forming device that can display an image having uniform resolution in a whole screen in close projection.

According to a first aspect of the invention, a light scanning device includes a light source outputting a laser beam, a light deflecting unit having a light reflecting unit, the light deflecting unit being adapted to be rotatable about a predetermined axis and scanning an object with the laser beam reflected by the light reflecting unit, a drive controlling unit controlling a deflection angle variation in a vertical direction of the light deflecting unit per unit time so that an interval between scanning lines in the vertical direction by the light deflecting unit is constant, and a driving unit rotationally driving the light deflecting unit in accordance with an rotational angle determined by the driving controlling unit.

According to the aspect, the deflection angle variation of the light deflecting unit per unit time is controlled so that the interval between the scanning lines in the vertical direction is constant. As a result, uniform resolution can be obtained in a whole projection plane.

It is preferable that the driving unit rotationally drive the light deflecting unit by an expansion and a contraction of a piezoelectric element. The piezoelectric element can be step-driven in units of several nanometers. This allows subtle control of the deflection angle. In a case where the deflection angle is controlled to vary the deflection angle variation in the vertical direction per unit time, it is preferable to utilize the expansion and the contraction of the piezoelectric element as a driving unit.

It is preferable that the light reflecting unit include a transmitting unit fixed to the light reflecting unit with a spacer sandwiched between the light reflecting unit and the transmitting unit, one side in an expansion-contraction direction of the piezoelectric element be made contact with the transmitting unit, and the transmitting unit transmit a drive force by the expansion and the contraction of the piezoelectric element to the light reflecting unit so that the light deflecting unit rotates about the predetermined axis. Accordingly, displacement of the piezoelectric element is directly transmitted to the light reflecting unit, so that considering damping and the like are unnecessary.

The light deflecting unit may be a galvano mirror. The galvano mirror shows a clear relation between a rotation angle and a driving current, enabling the deflection angle of the light deflecting unit to be easily controlled by the driving current.

According to a second aspect of the invention, an image forming device includes the light scanning device according to the first aspect. According to the aspect, the deflection angle variation of the light deflecting unit per unit time is controlled so that the interval between the scanning lines in the vertical direction is constant. As a result, uniform resolution can be obtained in a whole projection plane in close projection.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. In the embodiments, a first direction and a second direction will be described as a horizontal direction and vertical direction respectively.

First Embodiment

Figure 1:
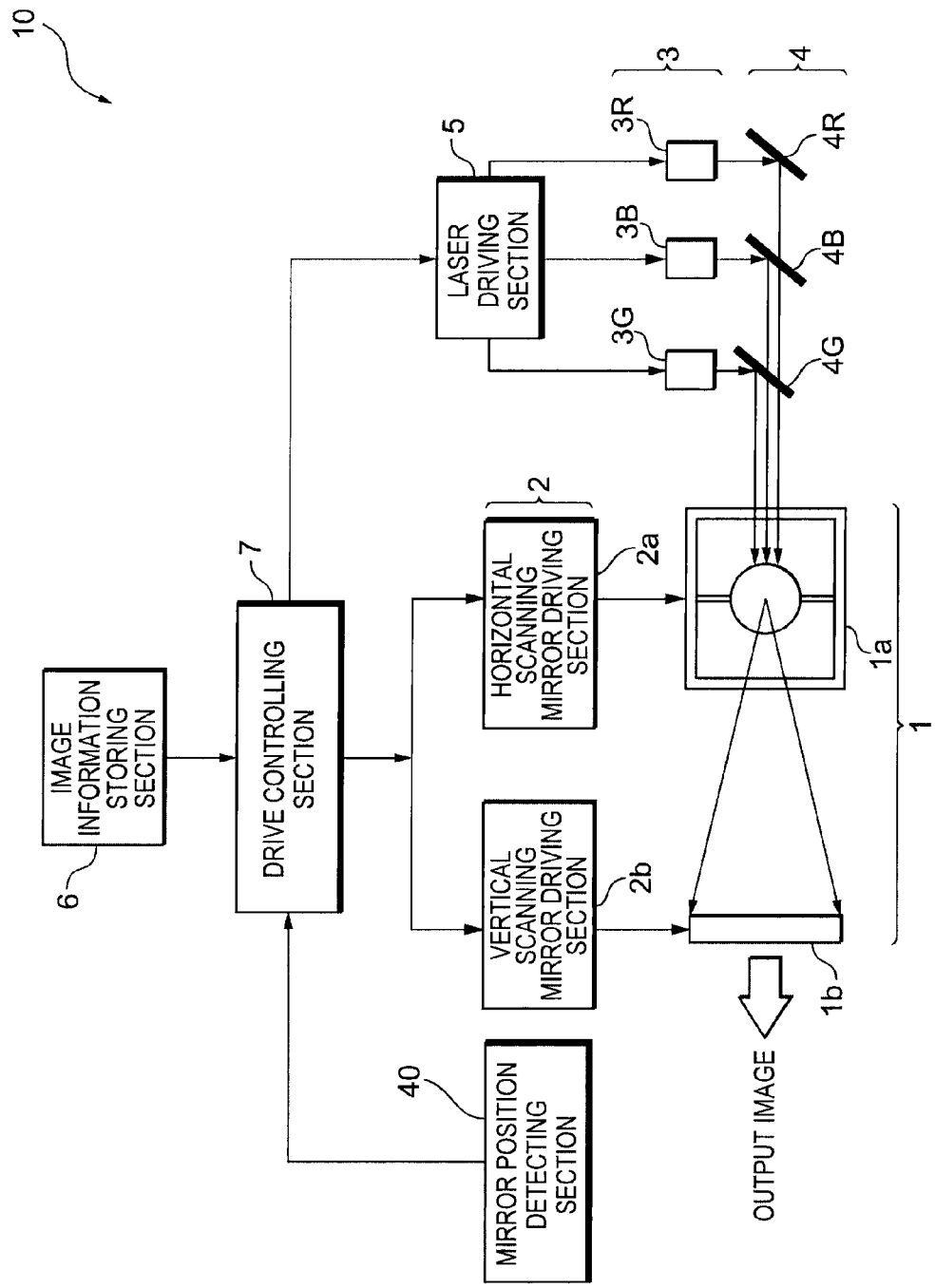
FIG. 1 is a block diagram illustrating a structure of a light scanning device according to a first embodiment.

FIG. 1 is a block diagram illustrating a structure of a light scanning device 10 according to a first embodiment. As illustrated, the light scanning device 10 includes a light deflector (a light deflecting unit) 1, a driving unit 2, a light source 3, a dichroic mirror 4, a laser driving unit 5, an image information storing unit 6, a drive controlling unit 7, and a mirror position detecting unit 40.

Figure 2:
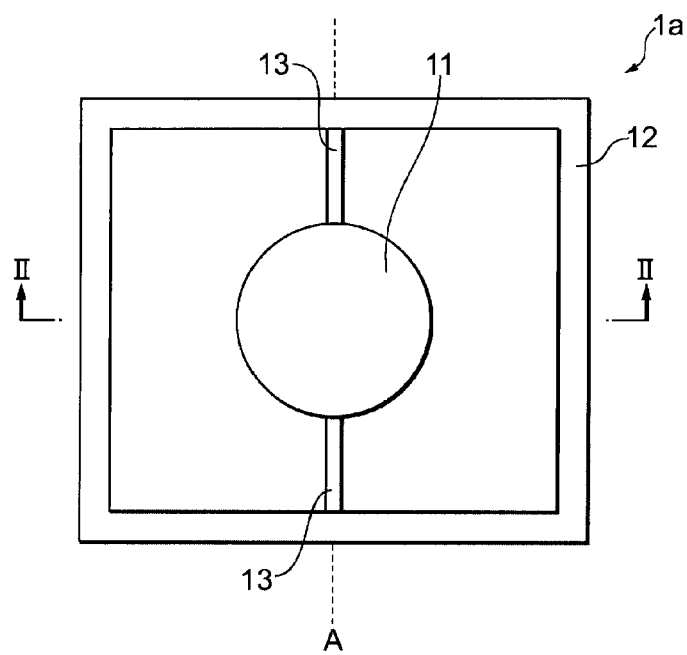
FIG. 2 is a plan view illustrating a structure of a light deflector.
Figure 3:
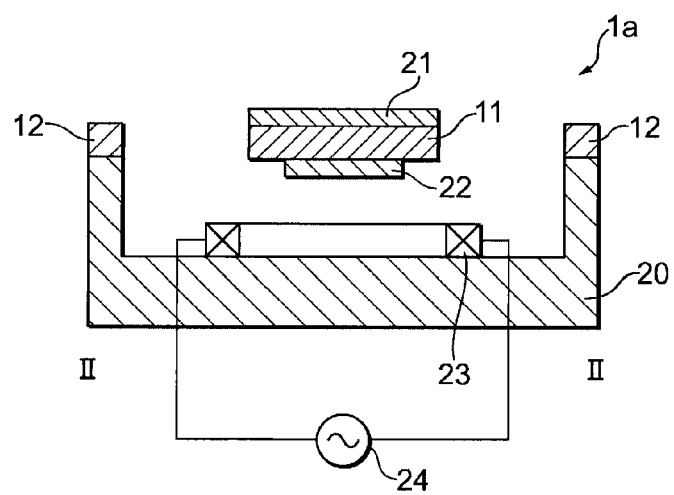
FIG. 3 is a sectional view along line II-II of FIG. 2.

The light deflector 1 includes a horizontal scanning mirror (a first reflecting unit) 1a for scanning, in a horizontal direction, laser beams transmitted from the dichroic mirror 4, and a vertical scanning mirror (a second reflecting unit) 1b for scanning, in a vertical direction, laser beams reflected by the horizontal scanning mirror 1a. The driving unit 2 includes a horizontal scanning mirror driving unit 2a for driving the horizontal scanning mirror 1a, and a vertical scanning mirror driving unit 2b for driving the vertical scanning mirror 1b. FIG. 2 is a plan view illustrating a structure of the horizontal scanning mirror 1a and the horizontal scanning mirror driving unit 2a. FIG. 3 is a sectional view along the line II-II of FIG. 2.

The horizontal scanning mirror 1a includes a movable plate 11 having a reflecting film 21 formed on a surface thereof, a support frame 12, and a pair of elastic supports 13 for supporting the movable plate 11 so that the movable plate 11 can torsionally rotate with respect to the support frame 12. The movable plate 11, the support frame 12, and the elastic supports 13 can be integrally formed by etching a silicon substrate, for example.

The horizontal scanning mirror driving unit 2a according to the present embodiment includes a permanent magnet 22, a coil 23, and an alternating-current signal generating circuit 24. The permanent magnet 22 is bonded to a back surface of the movable plate 11 so that is opposed to the reflecting film 21. The permanent magnets 22 is magnetized in a direction perpendicular to an axis A, which is a center axis of rotation of the rotor unit 11, when the movable plate 11 is viewed in a plan. That is, the permanent magnet 22 has a pair of magnetic poles having different polarities toward the axis A. The support frame 12 is bonded to a holder 20. On the holder 20, the coil 23 is provided for driving the movable plate 11.

The alternating-current signal generating circuit 24 supplies the coil 23 with a current (an alternating current) periodically varying. Accordingly, the coil 23 alternately generates a magnetic field directed upward (toward the movable plate 11) and a magnetic field directed downward. Accordingly, the movable plate 11 rotates about the A axis while twisting the elastic supports 13 so that one magnetic pole of the permanent magnet 22 approaches the coil 23 while the other magnetic pole is separated from the coil 23. At this time, a frequency of the current generated by the alternating-current signal generating circuit is set substantially equal to a torsional frequency of a vibration system formed with the movable plate 11, the elastic supports 13, and the permanent magnet 22.

FIG. 2 illustrates a vibrating mirror driven by an electromagnetic force between the permanent magnet 22 and the coil 23. In the invention, the driving system may be a system using an electrostatic force or a system using piezoelectric elements. For example, in a case of the system using an electrostatic force, the permanent magnet 22 is unnecessary, and a single or a plurality of electrodes opposing the movable plate 11 is provided instead of the coil 23. An alternating voltage periodically varying is applied between the movable plate 11 and the electrode, so that an electrostatic force is exerted between the movable plate 11 and the electrode. Consequently, the movable plate 11 rotates about the A axis while twisting the elastic supports 13. In this case, a frequency of the alternating voltage is set substantially equal to a torsional frequency of a vibration system formed with the movable plate 11 and the elastic supports 13.

The light source 3 outputs laser beams. The light source 3 includes a red color laser light source 3R for outputting red color laser beams, a blue color laser light source 3B for outputting blue color laser beams, and a green color laser light source 3G for outputting green color laser beams. Here, a laser light source having two colors or less or four colors or more may be employed.

The dichroic mirror 4 includes a dichroic mirror 4R for reflecting the red color laser beams from the red color laser light source 3R, a dichroic mirror 4B for reflecting the blue color laser beams while transmitting the red color laser beams, and a dichroic mirror 4G for reflecting the green color laser beams while transmitting the blue and red color laser beams. With the dichroic mirror 4 of three kinds, the combined beams of the red, blue, and green color laser beams are incident on the horizontal scanning mirror 1a.

The laser driving unit 5 controls an amount of current supplied to the red, blue, and green color laser light sources 3R, 3B, and 3G, controlling strength of laser beams outputted from each light source as well as a light-emitting period.

The image information storing unit 6 stores information on an image to be projected on a projection plane by laser beams scanned with the light scanning device 10.

Based on image information supplied from the image information storing unit 6 and deflection angle information on the horizontal scanning mirror 1a and the vertical scanning mirror 1b supplied from the mirror position detecting unit 40, the drive controlling unit 7 controls operations of the driving unit 2 so as to display the image. In addition, the drive controlling unit 7 supplies the laser driving unit 5 with the information on the image to be projected. Particularly in the embodiment, the drive controlling unit 7 controls a deflection angle variation of the vertical scanning mirror 1b per unit time so that intervals between scanning lines in the vertical direction are constant. The deflection angle information may be generated by detecting light, which is horizontally and vertically scanned, with a light sensor (not illustrated).

Figure 4:
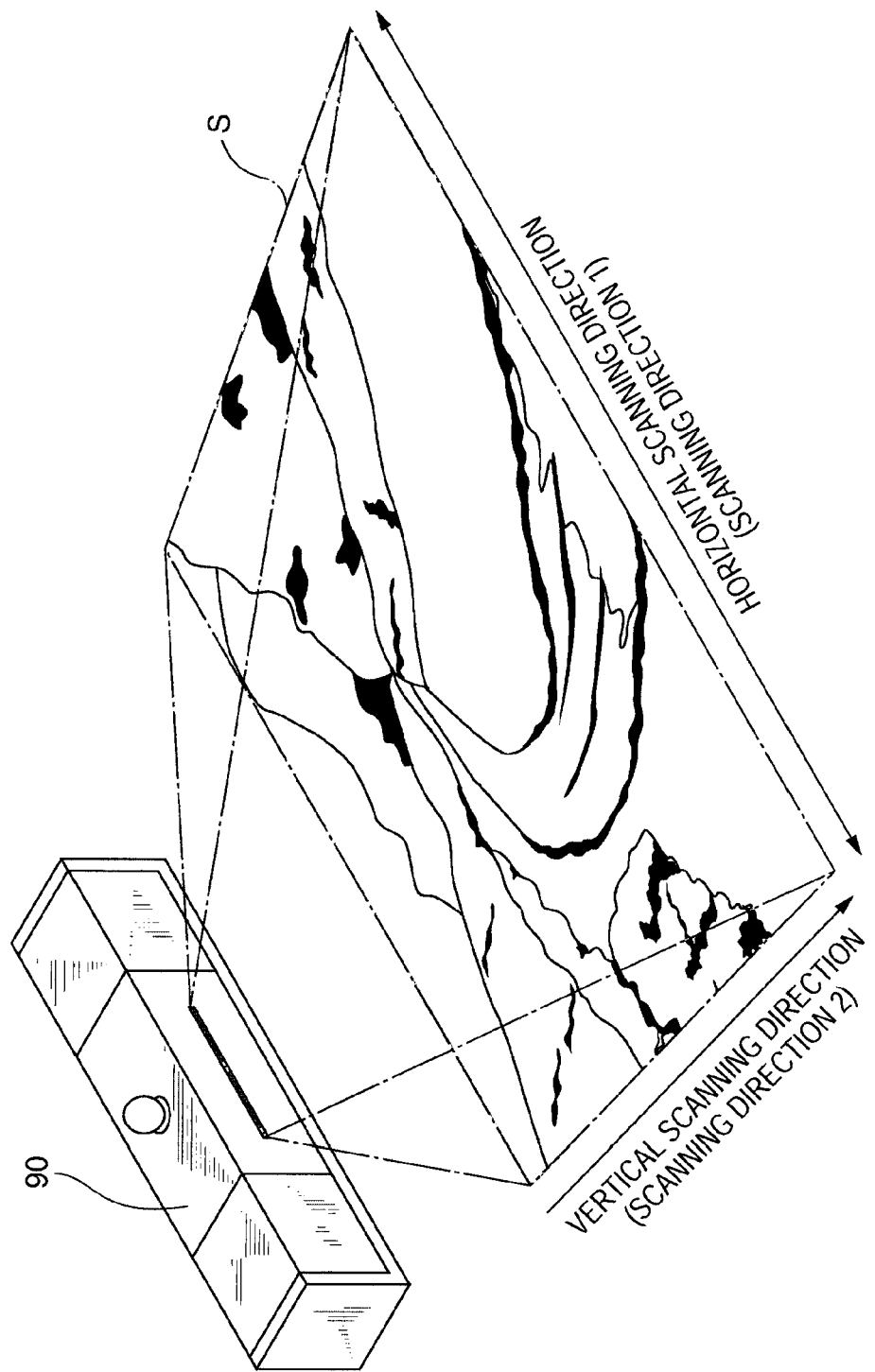
FIG. 4 is a perspective view illustrating a projector, which includes the light scanning device, and a projection plane.
Figure 5:
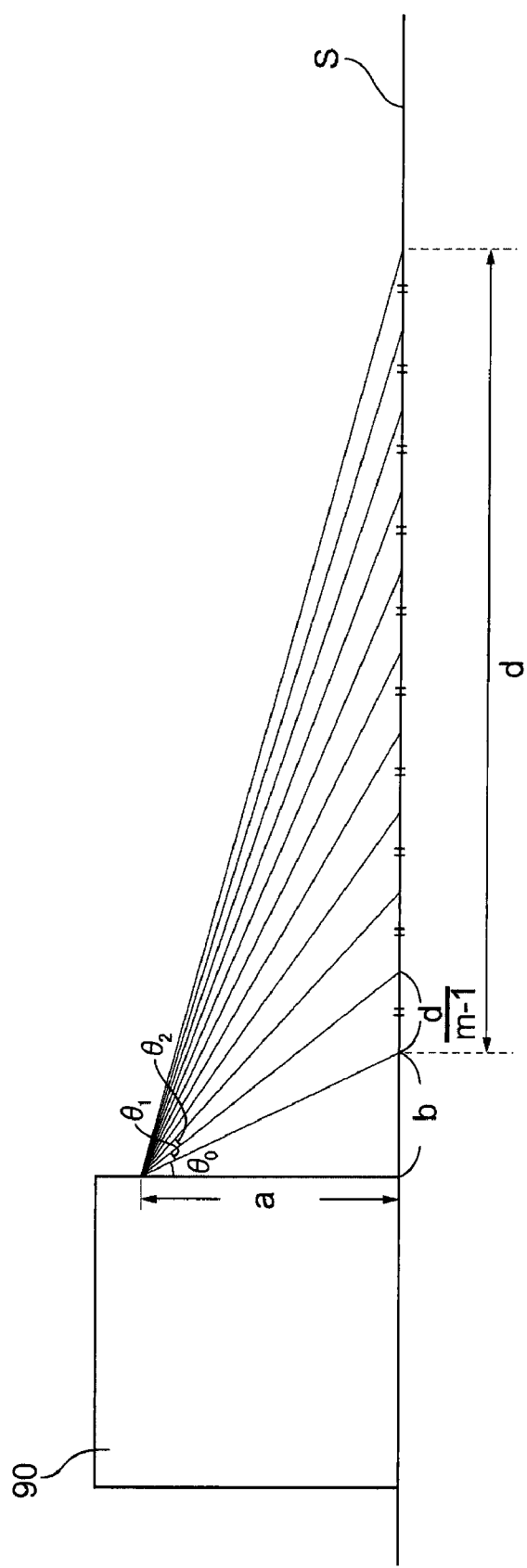
FIG. 5 is a diagram of the projector and the projection plane when viewed from a side.

Operations of the light scanning device 10 will be described with reference to FIGS. 4 and 5. FIG. 4 is a perspective view illustrating a projector (an image forming device) 90, which includes the light scanning device 10, and a projection plane S. FIG. 5 is a diagram of the projector 90 and the projection plane S when viewed from a side.

As illustrated in FIG. 4, the bottom surface of the projector 90 is in contact with the projection plane S. A region circle with dotted lines in FIG. 4 shows a drawing region of the projector 90. A scanning direction 1 is a horizontal scanning direction while a scanning direction 2 is a vertical scanning direction.

Refer to FIG. 5, $\theta_0, \theta_1, \theta_2 \ldots$ represent a deflection angle in the vertical direction produced by the vertical scanning mirror 1b. At the deflection angle $\theta_0$, the first line is drawn. As illustrated, intervals between the scanning lines in the vertical direction are constant. When the nth scanning line (n is an integer equal to or larger than 0 and equal to or less than m−1) counted from the light scanning device 10 is drawn, a deflection angle $\theta_n$ is expressed as the following equation 1 when the number of the scanning lines in the vertical direction is m.

$$\theta_n = \tan^{-1}(b+n \cdot d/m-1) \cdot 1/a - \tan^{-1}(b+(n-1) \cdot d/m-1) \cdot 1/a \quad \text{Equation 1}$$

Here, a is a height from the projection surface S to the light deflector 1 while b is a horizontal distance from the light deflector 1 to the zeroth line.

Figure 6A:
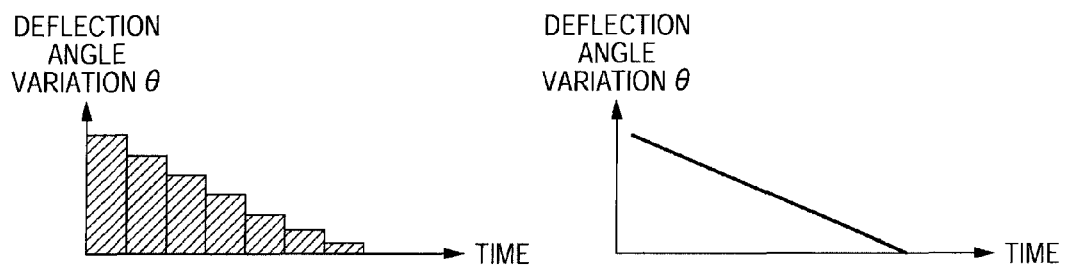
FIG. 6A is a diagram illustrating a method for controlling a deflection angle in a vertical direction of the light scanning device according to a comparative example.

FIG. 6A is a diagram illustrating a method for controlling the deflection angle in the vertical direction of the light scanning device according to a comparative example. In the example illustrated in FIG. 6A, a variation of the deflection angle θ per unit time is constant. In a case of controlling the deflection angle in this manner, the intervals between the scanning lines in the vertical direction become wider with increasing distance from the light scanning device. Thus, resolution of an image is not uniform in a whole screen.

Figure 6B:
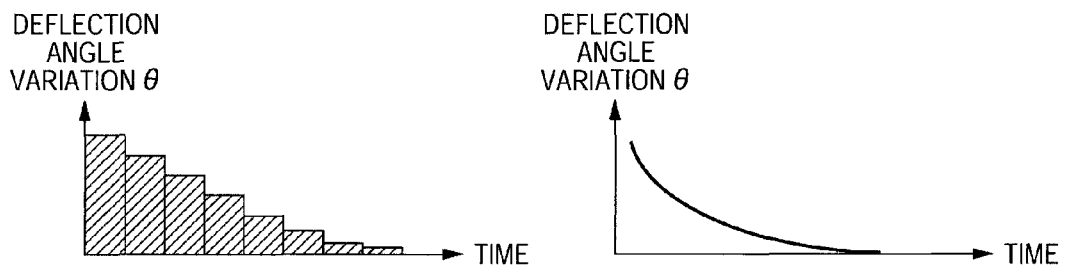
FIG. 6B is a diagram illustrating the method for controlling the deflection angle in the vertical direction of the light scanning device according to the first embodiment.

On the other hand, in the embodiment, the drive controlling unit 7 controls the deflection angle of the vertical scanning mirror 1b so that the intervals between the scanning lines in the vertical direction are constant. Consequently, as illustrated in FIG. 6B, the variation of the deflection angle θ per unit time is not constant.

As described above, according to the embodiment, the deflection angle variation of the vertical scanning mirror 1b per unit time is controlled so that the intervals between the scanning lines in the vertical direction are constant. As a result, uniform resolution can be obtained in a whole projection plane.

Here, the light scanning device 10 according to the invention may include any substitute that has the same function as its original structure and may include any additional structure. The light scanning device 10 according to the embodiment includes the horizontal scanning mirror 1a and the vertical scanning mirror 1b. The light scanning device 10 may include a single mirror capable of rotating about two axes so as to perform scanning in the horizontal direction and the vertical direction with the single mirror.

Second Embodiment

Figure 7:
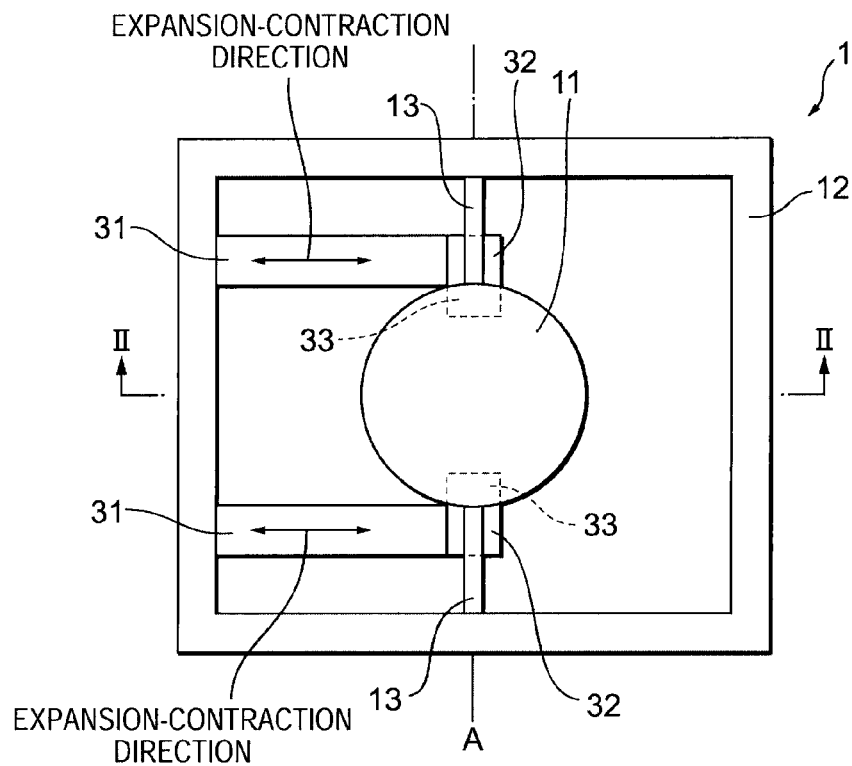
FIG. 7 is a plan view illustrating a structure of the light deflector according to a second embodiment.
Figure 8:
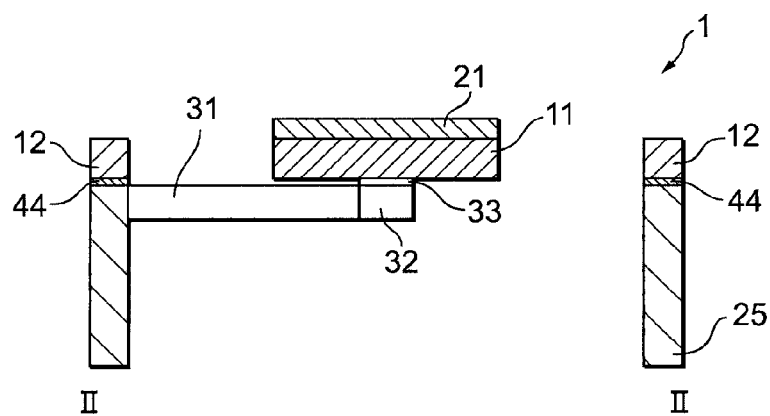
FIG. 8 is a sectional view along line II-II of FIG. 7.

FIG. 7 is a plan view illustrating a structure of the vertical scanning mirror 1b and the vertical scanning mirror driving unit 2b according to a second embodiment. FIG. 8 is a sectional view along the line II-II of FIG. 7. In the second embodiment, the vertical scanning mirror driving unit 2b of the light scanning device 10 rotationally drives the vertical scanning mirror 1b by expansion-contraction of a piezoelectric element by applying electricity to the piezoelectric element.

As illustrated in FIGS. 7 and 8, the vertical scanning mirror 1b of the light scanning device 10 includes the movable plate (a light reflecting unit) 11 having the reflecting film 21 formed on the surface thereof, the pair of the elastic supports 13 for supporting the movable plate 11 so that the movable plate 11 can torsionally rotate with respect to the support frame 12, a holder 25 for supporting the support frame 12 with a connection layer 44 sandwiched therebetween, a transmitting member (a transmitting unit) 32 fixed to the movable plate with a spacer 33 sandwiched therebetween. Further, as illustrated in FIGS. 7 and 8, the vertical scanning mirror driving unit 2b includes a pair of piezoelectric elements 31 and an alternating voltage generating circuit (not illustrated) for applying an alternating voltage signal to each of the piezoelectric elements 31.

The piezoelectric element 31 is provided so as to expand and contract in a direction perpendicular to the axis A. The piezoelectric element 31 is provided so that one end in an expansion-contraction direction of the piezoelectric element 31 is bonded to and supported by the holder 25 while the other end is bonded to or made contact with the transmitting member 32. At this time, the piezoelectric element 31 may be provided in a state that an offset voltage is applied thereto (in a state that the piezoelectric element 31 is expanded).

The piezoelectric element 31 is not particularly limited, but is preferably formed with piezoelectric layers and electrode layers alternatively laminated into a plurality of layers. This enables a size in the expansion-contraction direction of the piezoelectric element 31 and an applied voltage (a driving voltage) to the piezoelectric element 31 to be limited while displacement of the piezoelectric element 31 to be increased. The piezoelectric element 31 is coupled to an alternating current power source (not illustrated), and a voltage periodically varying is applied to the piezoelectric element 31. Consequently, the piezoelectric element 31 can expand and contract.

The transmitting member 32 receives a drive force of the piezoelectric element 31 and is displaced in a direction perpendicular to the axis A, having a function of rotating the movable plate 11 about the axis A. The transmitting member 32 is bonded to the movable plate 11 at a position eccentric to the axis A in a thickness direction of the movable plate 11, and is adapted to transmit the drive force of the piezoelectric element 31 to the movable plate 11. More specifically, the transmitting member 32 is made contact with or bonded to the piezoelectric element 31, and is bonded to the movable plate 11 with the spacer 33 interposed therebetween in the vicinity of the elastic support 13. In the vertical scanning mirror 1b according to the present embodiment, the movable plate 11, the elastic support 13, the spacer 33, the transmitting member 32, the support frame 12, the connection layer 44, and the holder 25 may be integrally formed by carrying out a removal process on a substrate having an oxide layer between first and second silicon layers (so-called an SOI substrate). To be specific, the movable plate 11, the elastic support 13, and the support frame 12 are formed on the first silicon layer, the spacer 33 and the connection layer 44 are formed on the oxide layer, and the transmitting member 32 and the holder 25 are formed on the second silicon layer.

By applying electricity, the piezoelectric element 31 expands and contracts. The transmitting member 32 applies a torque around the axis A to the movable plate 11. In this manner, the vertical scanning mirror driving unit 2b rotates the movable plate 11. The expansion-contraction direction of the piezoelectric element 31 is perpendicular to the thickness direction of the movable plate 11. Accordingly, a size of the light scanning device 10 in the thickness direction of the movable plate 11 can be limited while the displacement of the piezoelectric element 31 can be increased by increasing a length of the piezoelectric element 31 in the expansion-contraction direction.

A rotational angle of the movable plate 11 with respect to the displacement of the piezoelectric element 31 approximately corresponds a distance between the axis A, in the thickness direction of the movable plate 11, and the piezoelectric element 31 (a point where a force is applied, i.e., an effort). The distance and the effort are adequately set in accordance with a mounting position or a shape of the piezoelectric element 31. The mounting position of the piezoelectric element 31 can be arbitrarily set in accordance with a thickness or a shape of the transmitting member 32. Consequently, it is possible to improve a degree of freedom in design of the light scanning device 10. Further, since the transmitting member 32 is bonded to one end in the thickness direction of the movable plate 11 (bonded to the lower surface of the movable plate 11 in the embodiment), the transmitting member 32 can apply a torque around the axis A to the movable plate 11 in an effective manner. Therefore, it is possible to prevent a swing of the axis A, which is the center axis of rotation of the movable plate 11, and thereby the movable plate 11 can smoothly rotate. In a case of integrally forming the vertical scanning mirror 1b with an SOI substrate, high positional accuracy in each element and high productivity are obtained.

As described above, the movable plate 11 of the vertical scanning mirror 1b is driven by the expansion-contraction of the piezoelectric element 31, so that the piezoelectric element can be step-driven in units of several nanometers. This allows subtle control of the deflection angle. Further, the displacement of the piezoelectric element 31 is directly transmitted to the movable plate 11 through the transmitting member 32, so that considering damping and the like are unnecessary. In other words, in a case of an electromagnetic drive or an electrostatic drive, the movable plate 11 can freely move. Thus, consider damping and the like are necessary. In the embodiment, the piezoelectric element 31 is directly coupled to the movable plate 11 with the transmitting member 32 interposed therebetween, so that movements of the movable plate 11 can be in conjunction with movements of the piezoelectric element 31. As the light scanning device 10 according to the invention, in a case where the deflection angle is controlled to vary the deflection angle variation in the vertical direction per unit time, as described in the embodiment, it is preferable to utilize the expansion-contraction of the piezoelectric element as a driving unit of the light deflector 1. The piezoelectric element may be employed to only a driving unit in the vertical direction while an electromagnetic force, as the first embodiment, may be employed as a driving unit in the horizontal direction.

As the vertical scanning mirror 1b, a galvano mirror may be employed. The galvano mirror has a clear relation between a desired rotation angle and a driving current. If the deflection angle illustrated in FIG. 6B is the desired rotation angle, the deflection angle can be easily controlled by the driving current. In a case of adapting the galvano mirror, a size of the vertical deflecting unit is somewhat larger than the one adapting the piezoelectric element described in the second embodiment, and also causing a high cost. However, the deflection angle is advantageously controlled with ease.

What is claimed is:

1. A light scanning device, comprising:
a light source outputting a laser beam;
a light deflecting unit having a light reflecting unit, the light deflecting unit being adapted to be rotatable about an axis and scanning an object with the laser beam reflected by the light reflecting unit;
a drive controlling unit controlling a deflection angle variation in a vertical direction of the light deflecting unit per unit time so that an interval between scanning lines in the vertical direction reflected by one mirror of the light reflecting unit of the light deflecting unit is constant; and
a driving unit rotationally driving the light deflecting unit in accordance with a rotational angle determined by the driving controlling unit;
wherein the driving unit includes a piezoelectric element; and
wherein the light reflecting unit includes a transmitting unit fixed to the light reflecting unit with a spacer sandwiched between the light reflecting unit and the transmitting unit, the piezoelectric element is located on one side with respect to the axis, one side in an expansion-contraction direction of the piezoelectric element is made contact with the transmitting unit, and the transmitting unit transmits a drive force by the expansion and the contraction of the piezoelectric element to the light reflecting unit so that the light deflecting unit rotates about the predetermined axis.

2. An image forming device, comprising:
the light scanning device according to claim 1.

* * * * *